United States Patent [19]

Hermansson et al.

[11] Patent Number: 5,657,373
[45] Date of Patent: Aug. 12, 1997

[54] DIGITAL MOBILE TELEPHONE SYSTEM IN WHICH EACH SUBSCRIBER IS ASSIGNED A TELEPHONE NUMBER AND SEVERAL SUBSCRIBER IDENTITY MODULE (SIM) CARDS

[75] Inventors: Jan Hermansson, Lyckeby; Christer Mansson, Karlskrona; Anders Jacobsson, Nattraby; Zeth Nystrom, Nybro; Bo Karlsson, Lyckeby; Christer Palmgren, Karlskrona; Goran Leuhusan, Karlskrona; Flemming Orneholm, Karlskrona, all of Sweden

[73] Assignee: Europolitan AB, Karlskrona, Sweden

[21] Appl. No.: 406,852
[22] PCT Filed: Sep. 30, 1993
[86] PCT No.: PCT/SE93/00784
  § 371 Date: Sep. 5, 1995
  § 102(e) Date: Sep. 5, 1995
[87] PCT Pub. No.: WO94/08433
  PCT Pub. Date: Apr. 14, 1994

[30] Foreign Application Priority Data

Oct. 1, 1992 [SE] Sweden .................................. 9202847

[51] Int. Cl.[6] ...................................................... H04Q 7/38
[52] U.S. Cl. .......................... 455/435; 379/357; 455/551; 455/558
[58] Field of Search .................................. 379/59, 58, 357, 379/62, 63; 455/33.1, 89, 90

[56] References Cited

FOREIGN PATENT DOCUMENTS

| 481714 | 4/1992 | United Kingdom | 379/59 |
| 2267794 | 12/1993 | United Kingdom | 379/59 |
| 2269512 | 2/1994 | United Kingdom | 379/59 |

*Primary Examiner*—William Cumming
*Assistant Examiner*—Myron Wyche
*Attorney, Agent, or Firm*—Young & Thompson

[57] ABSTRACT

A digital mobile communication system comprises a switching center (MSC), a subscriber register (HLR) connected thereto, mobile terminals, such as mobile telephones, and subscriber-linked subscriber's cards, such as smart cards. Each subscription is allocated a subscriber's number and at least two subscriber's cards adapted to be activated so as to open a mobile terminal to incoming as well as outgoing traffic when inserted therein. When one of the subscriber's cards is activated, the other card or cards are necessarily deactivated so as to open a mobile terminal only to outgoing traffic when inserted therein. The subscriber register (HLR) is adapted to control the activation and the deactivation of the cards by the order of the subscriber.

5 Claims, 2 Drawing Sheets

DIGITAL MOBILE TELEPHONE SYSTEM IN WHICH EACH SUBSCRIBER IS ASSIGNED A TELEPHONE NUMBER AND SEVERAL SUBSCRIBER IDENTITY MODULE (SIM) CARDS

FIELD OF THE INVENTION

This invention relates to a digital mobile communication system comprising a switching centre, a subscriber register connected thereto, mobile terminals, such as mobile telephones, and subscriber-linked subscriber's cards, such as smart cards, insertable in the mobile terminals.

DESCRIPTION OF THE PRIOR ART

With mobile communication systems, it is always possible to reach the subscribers within the coverage area of the system, regardless of where they are, which is a considerable advantage. It may also be advantageous, e.g. when travelling, to have a telephone ready to hand at all times and thus not have to depend on pay phones and small change when making important telephone calls.

In prior-art mobile communication systems, the subscriber's number has always been linked to the mobile telephone itself, so that a subscriber possessing two mobile telephones, e.g. one mounted in a vehicle and one to be carried along, has had at that two different subscriber's numbers and, consequently, two different subscriptions. However, this inconvenience of the subscriber having different subscriber's numbers and different subscriptions when possessing several mobile telephones was initially not inherent in a new digital mobile communication system called GSM (Global System for Mobile Communications).

This system, which has a large coverage area as a result of far-reaching international cooperation, is distinguished by communication taking place by means of digital signal transmission and by the subscription being linked to a subscriber's card that can be inserted by the subscriber in different mobile terminals in order to activate these. A mobile terminal holding such a subscriber's card can be reached at the subscriber's number linked to the subscriber's card, and outgoing traffic from this mobile terminal, such as telephone calls, telefax transmissions and data communication, is as a rule debited the subscription linked to the subscriber's card, i.e. the mobile terminal as such is of minor importance in this system and the subscription is embodied by the subscriber's card.

The subscriber's card is a so-called smart card which in GSM contexts is referred to as SIM (Suscriber Identity Module) and contains at least one microchip which holds information on the subscription and which, when the SIM card is inserted in a mobile terminal, is connected thereto.

The original SIM card had the size of an ordinary credit card and was intended to be insertable in any GSM mobile terminal. However, the "credit-card" size soon proved to be inconvenient in small pocket phones, and a smaller "stamp-size" SIM card, containing the same type of microchip and thus compatible with the large SIM card, was introduced as a complement to the large card. Generally, the small SIM card fits all existing mobile terminals but is not, owing to its small size, as easy to handle as the large card and therefore is best suited to be more or less permanently installed in a mobile terminal.

When subscribing to GSM, the customer has to choose between a large SIM card, which is easy to handle and store owing to its "credit-card" size but which is too large for small pocket phones, and a small SIM card, which certainly fits into small pocket phones but which is difficult to handle and easily lost owing to its small size.

The only possibility up to now has been to recommend the customer to have two GSM subscriptions, one for each card. This solution not only has the inconvenience of entailing a double set of bills, giving both the GSM net-work operator and the subscriber extra trouble, but also involves uncertainty as to the subscriber's number at which the subscriber can be reached at the moment, two subscriptions requiring by necessity two different subscriber's numbers.

OBJECT OF THE INVENTION

The object of this invention is to remedy the above inconveniences.

SUMMARY OF THE INVENTION

According to the invention, this object is achieved by a digital mobile communication system of the type mentioned by way of introduction, which is characterised in that each subscription is allocated a subscriber's number and at least two subscriber's cards adapted to be activated so as to open a mobile terminal to incoming as well as outgoing traffic when inserted therein, such that, when one of the cards is activated, the other or others are necessarily deactivated so as to open a mobile terminal only to outgoing traffic when inserted therein, the subscriber register being adapted by the order of the subscriber to control the activation and the deactivation of the cards.

Preferably, the cards have different identity numbers, each stored in a record in the subscriber register, the subscriber number is stored only in the record containing the identity number of the activated card, and the subscriber register is adapted, by the order of the subscriber, to shift the identity numbers between the different records so as to activate and deactivate, respectively, the cards. Alternatively, it may be the subscriber's number and not the identity numbers that is shifted between the different records so as to activate and deactivate, respectively, the cards, or the identity numbers can each be stored in an element in one and the same record in the subscriber register, the subscriber's number being linked only to the element containing the identity number of the activated card, and the subscriber register being adapted, by the order of the subscriber, to link the subscriber's number to another of the elements in the record so as to activate and deactivate, respectively, the cards.

Finally, one of the subscriber's cards preferably is a small "stamp-size" card, while another of the subscriber's cards is a large "credit-card-size" card.

Preferred embodiments of the invention will be described in more detail below with reference to the accompanying drawings.

DESCRIPTION OF THE PREFERRED EMBODIMENTS

Figure 1:
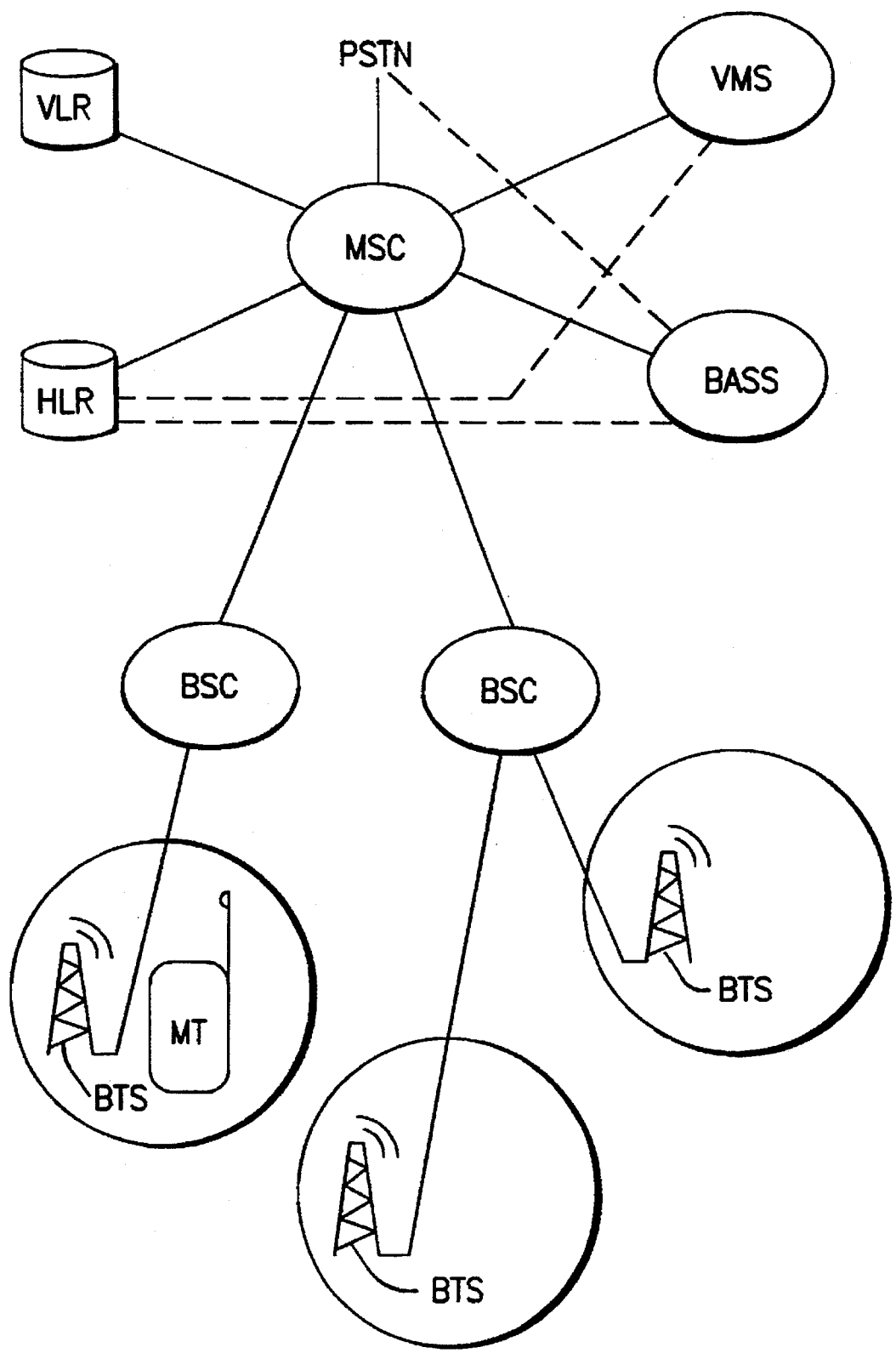
FIG. 1 is a general schematic view of a mobile communication system.
Figure 2:
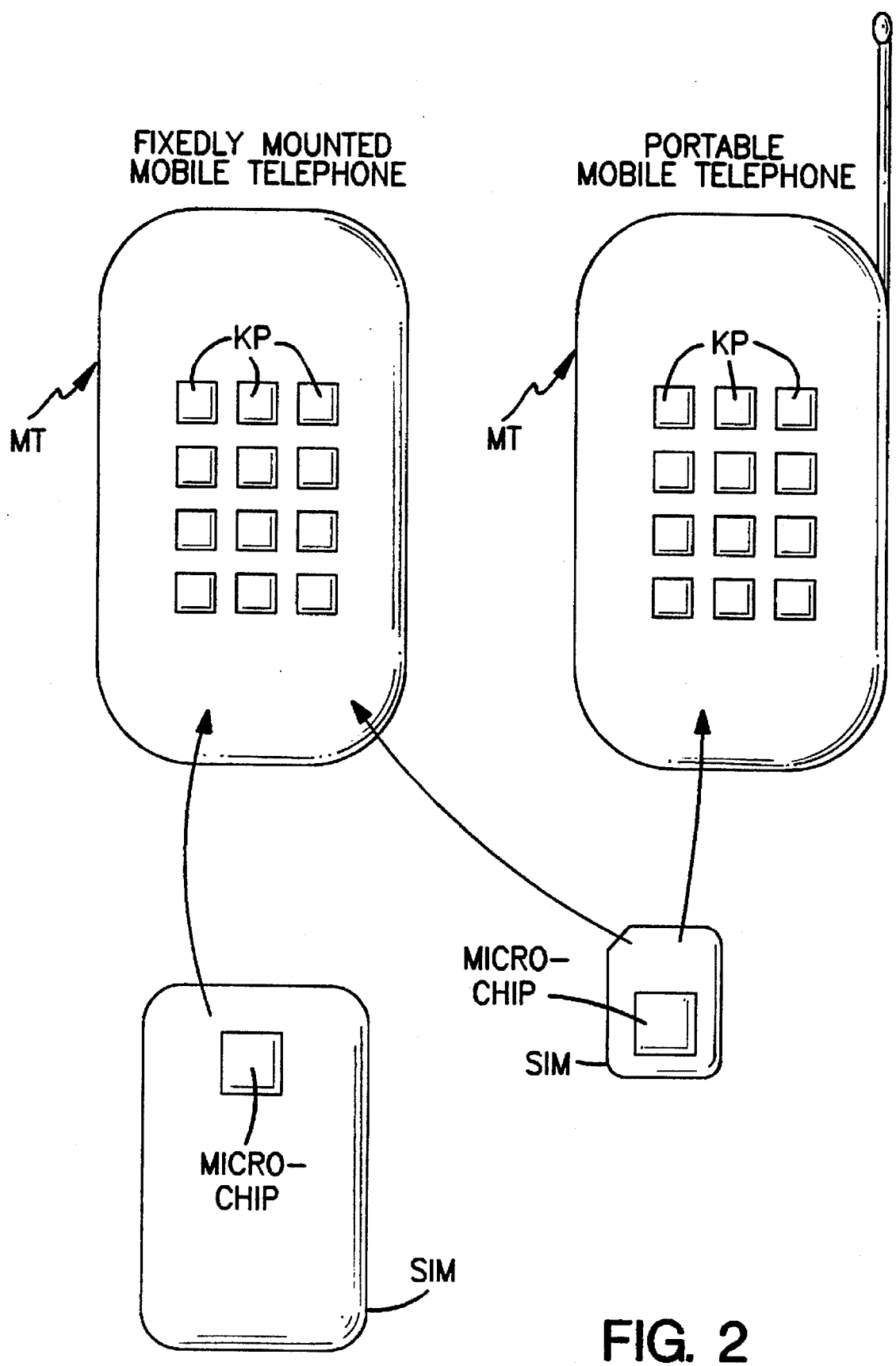
FIG. 2 is a schematic view of a large and a small subscriber's card, as well as of the associated mobile terminals.

The illustrated mobile communication system is generally known as GSM and is based on subscriber's cards in the form of smart cards and on digital signal transmission. The reference signs used throughout this specification are essentially in keeping with the terminology used in this system.

In GSM, the wireless signal transmission between a mobile station MS, such as a mobile telephone, a fax machine or a computer, and a base station BTS (Base Transceiver System) is digital and less sensitive to interference. A base station BTS is made up of a transceiver aerial and defines a certain coverage area.

A GSM network includes a large number of base stations BTS, which are connected to base station controllers BSC, each of which controls and supervises a number of base stations BTS. The base station controllers BSC are in turn connected to at least one switching centre MSC (Mobile services Switching Centre).

The switching centre MSC is adapted to control the traffic within a GSM network, as well as between this network and other networks connected thereto, such as a public telephone network PSTN (Public Switched Telephone Network) or the GSM network of another operator.

Two different registers are also connected to the switching centre MSC, namely a home location register HLR containing information on the system's own subscribers, and a visitor location register VLR containing information on active, and consequently registered, visitors found in the coverage area of the GSM network. A visitor is either a home subscriber or a subscriber associated with another GSM operator. The information in the visitor location register VLR is always retrieved from the subscriber's home location register HLR and includes an identity number IMSI (International Mobile Subscriber Identity) making it possible to positively identify and address a visitor. If a registered visitor ceases to be active in the network associated with the visitor location register VLR, the information on him found in the visitor location register VLR can be erased, to be retrieved from the home location register HLR when he becomes active again.

In addition to the home location register HLR, the identity number IMSI is always stored in a subscriber's card SIM, a smart card, by means of which the mobile equipment is connected to a GSM network.

At present the subscriber's card SIM is available in two sizes, namely one "credit-card" size and one "stamp" size. However, the microchip in the card is of the same type for both sizes and consists of a small single-chip microcomputer. When inserting the subscriber's card SIM in a mobile terminal MT, such as a mobile telephone, the microchip of the card is connected to the mobile terminal which it thus activates. In GSM contexts, such an activated mobile terminal MT is referred to as a mobile station MS.

Since there is not room for the large subscriber's card SIM in small pocket phones, a subscriber intending to use such a small mobile telephone should of course, when subscribing to the system, be given a small "stamp-size" subscriber's card SIM, which also can be used in large-size mobile terminals MT. Regrettably, however, the small subscriber's card SIM is difficult to handle owing to its small size, and therefore rather lends itself to more or less permanent installation in the mobile equipment used most frequently by the subscriber, whereas the large subscriber's card SIM, owing to its handy "credit-card" size, is to be preferred for occasional use, e.g. when the subscriber is travelling and does not bring his own mobile equipment along.

Till now, each subscriber's card SIM, having its identity number IMSI in the home location register HLR, has always been firmly linked to the associated subscriber's number in one record. In the mobile communication system according to the invention, this has now been changed as follows.

When subscribing to the system, the customer obtains at least two subscriber's cards SIM, of which one is small and one is large. As before, different identity numbers IMSI, having their counterparts in the home location register HLR of the subscription, are stored in the subscriber's cards SIM. In the home location register HLR, the identity numbers IMSI of the two subscriber's cards are stored in one record each, but only one of the records also contains the customer's subscriber's number. This means that only one of the two subscriber's cards SIM associated with the same subscription is activated, i.e. can be addressed when there is incoming traffic to the subscriber, namely the card whose identity number IMSI is stored in the same record as the subscriber's number in the home location register HLR, while the other subscriber's card SIM of the subscription is deactivated, i.e. cannot be addressed when there is incoming traffic to the subscriber. However, the subscriber's cards SIM always open the associated mobile terminals MT to outgoing traffic, and the cards can always be identified owing to their unique identity numbers IMSI.

Since the subscriber's cards SIM always permit outgoing traffic when inserted in a mobile terminal MT, the subscriber can, by means of the mobile terminal MT, get in touch with the operator's company exchange or with a switching centre MSC in the network, and hence with different operator service options in connection therewith.

One such option may be a billing administration support system BASS where the subscriber gets in touch with telephone operators, or a voice mail system VMS which the subscriber has access to via service-specific codes entered on the key pad KP of his mobile terminal. When the subscriber orders the activation of a deactivated subscriber's card SIM, one of the two systems BASS and VMS, or some other suitable system, may enter the home location register HLR and activate one of the subscriber's cards SIM while simultaneously deactivating the currently activated subscriber's card SIM either by shifting, in the home location register HLR, the identity number IMSI of the currently activated subscriber's card SIM from a record for the subscription, which also contains the subscriber's number, to another record for the subscription, which does not contain the subscriber's number but contains the identity number IMSI of the currently deactivated subscriber's card SIM, while simultaneously shifting the last-mentioned identity number IMSI to the record containing the subscriber's number, or by shifting the subscriber's number from a record for the subscription, which is associated with the currently activated subscriber's card SIM which is deactivated after the shift, to another record for the subscription, which is associated with the currently deactivated subscriber's card SIM which is activated after the shift. The subscriber never notices the shift of the identity numbers or the subscriber's number between the two records, but merely finds that the cards are easily activated and deactivated as often as he wishes.

Alternatively, the identity numbers IMSI of the subscriber's cards SIM can be stored in one element each in one and the same record in the subscriber register HLR. In this record, the subscriber's number is then linked only to the identity number IMSI of the activated card SIM, so that the alternation between the cards SIM is achieved by linking the subscriber's number to another record element containing another identity number IMSI.

Naturally, it is also conceivable to activate a subscriber's card SIM automatically, by the subscriber's standing order, as soon as the card is inserted in a mobile terminal MT or as soon as this terminal is used for an outgoing call.

The invention expediently remedies, in a manner advantageous to the subscriber as well as the operator, the inconveniences caused by the original "credit-card-size" subscriber's card SIM being complemented with a small subscriber's card SIM which fits into even small pocket phones.

Even though the preferred embodiment described above relates to a GSM network, the invention is of course not restricted to this type of network, and can also be applied to other digital mobile communication systems where the subscription is linked to smart cards.

We claim:

1. A digital mobile communication system comprising a switching centre (MSC), a subscriber register (HLR) connected thereto, mobile terminals (MT), such as mobile telephones, and subscriber-linked subscriber's cards (SIM), such as smart cards, insertable in the mobile terminals (MT), characterised in that each subscription is allocated a subscriber's number and at least two subscriber's cards (SIM) adapted to be activated so as to open a mobile terminal (MT) to incoming as well as outgoing traffic when inserted therein, such that, when one of the cards is activated, the other or others are necessarily deactivated so as to open a mobile terminal (MT) only to outgoing traffic when inserted therein, the subscriber register (HLR) being adapted, by the order of the subscriber, to control the activation and the deactivation of the cards.

2. A digital mobile communication system as set forth in claim 1, characterised in that the subscriber's cards (SIM) have different identity numbers (IMSI), each stored in a record in the subscriber register (HLR), that the subscriber's number is stored only in the record containing the identity number (IMSI) of the activated card, and that the subscriber register (HLR) is adapted, by the order of the subscriber, to shift the identity numbers between the different records so as to activate and deactivate, respectively, the cards (SIM).

3. A digital mobile communication system as set forth in claim 1, characterised in that the subscriber's cards (SIM) have different identity numbers (IMSI), each stored in a record in the subscriber register (HLR), that the subscriber's number is stored only in the record containing the identity number (IMSI) of the activated card, and that the subscriber register (HLR) is adapted, by the order of the subscriber, to shift the subscriber's number between the different records so as to activate and deactivate, respectively, the cards (SIM).

4. A digital mobile communication system as set forth in claim 1, characterised in that the subscriber's cards (SIM) have different identity numbers (IMSI), each stored in an element in one and the same record in the subscriber register (HLR), that the subscriber's number is linked only to the element containing the identity number (IMSI) of the activated card (SIM), and that the subscriber register (HLR) is adapted, by the order of the subscriber, to link the subscriber's number to another of the elements in the record, so as to activate and deactivate, respectively, the cards (SIM).

5. A digital mobile communication system as set forth in claim 1, characterised in that one of the subscriber's cards (SIM) is a small "stamp-size" card, and that another of the subscriber's cards (SIM) is a large "credit-card-size" card.

* * * * *

UNITED STATES PATENT AND TRADEMARK OFFICE
CERTIFICATE OF CORRECTION

PATENT NO. : 5,657,373
DATED : August 12, 1997
INVENTOR(S) : Jan HERMANSSON et al.

It is certified that error appears in the above-indentified patent and that said Letters Patent is hereby corrected as shown below:

On the title page, [75] Inventors, change the surname of one of the inventors, from "Leuhusan" to --Leuhusen--.

Signed and Sealed this

Fourteenth Day of October, 1997

Attest:

BRUCE LEHMAN

*Attesting Officer*  *Commissioner of Patents and Trademarks*